UNITED STATES PATENT OFFICE.

HENRY HOWARD, OF BROOKLINE, MASSACHUSETTS.

EXTRACTION OF ZINC AND COPPER FROM ORES.

SPECIFICATION forming part of Letters Patent No. 623,154, dated April 18, 1899.

Application filed May 14, 1898. Serial No. 680,713. (No specimens.)

*To all whom it may concern:*

Be it known that I, HENRY HOWARD, of Brookline, county of Norfolk, State of Massachusetts, have invented an Improvement in Extraction of Zinc and Copper from Ores, of which the following is a specification.

This invention has for its object the production of a process for extracting zinc and copper economically either from ores or from the residues of other operations—such, for instance, as pyrites-cinder, the residue from the manufacture of sulfuric acid. I have devised not only an economical but a continuous process accompanied by the recovery of various substances as by-products, together with the convenient regeneration and utilization of the agents used in the process.

My process of extraction is particularly adapted for the recovery of zinc and copper from pyrites-cinder, and I will describe my invention in connection therewith, though it is to be understood that my invention is not restricted in its application thereto.

In carrying out my invention I prefer for the sake of more rapid and convenient action to treat the cinder or other substance from which the metals are to be extracted in a moderately finely-divided state, a convenient quantity being placed in a suitable digester of any desired or usual construction. The material may, however, be treated in any apparatus arranged for systematic leaching, whereby the nearly-extracted substance would be brought in contact with the fresh solvent and the nearly-saturated solvent in contact with the unexhausted substance.

The solvent to be used in my process is aqua-ammonia, the solvent power of which is increased by the presence of ammonium sulfate dissolved in the aqua-ammonia preferably to the saturation-point.

A suitable quantity of the solvent is introduced into the digester to dissolve the ZnO and CuO in the material to be treated, and as the solvent is capable of easily dissolving one hundred grams of ZnO per liter the amount of solvent to be added may be readily calculated after analysis of the material. If, however, the extraction is carried out by systematic leaching, the strength of the outgoing strong liquor may be maintained at the desired point by regulating the flow of the ingoing solvent.

The solid material and the solvent should in the former case be thoroughly mixed in the digester in any suitable manner, as by rotation of the digester. Tests are made from time to time to note the character of the solution and the amount of ZnO therein, the time required for the solving of the ZnO and CuO varying according to circumstances. When the solving of the oxids is effected, the solution is separated from the solid residue, preferably by decantation and washing, preferably with aqua-ammonia, and the solution is then filtered or settled and any $NH_3$ remaining in the extracted substance is driven off by heat and collected, after which the copper is separated out by any suitable means—viz., by metallic zinc, or, if desired, by the use of $H_2S$, alkaline sulfid, zinc sulfid, or electrolysis. I prefer the separation by metallic zinc, as the copper is thereby separated in better condition for use, and the separation is readily effected, the zinc being recovered subsequently. In separating the copper by this method if enough surface of metallic zinc is exposed to make the separation proceed rapidly a good deal more of the zinc will be dissolved than is indicated by the equation

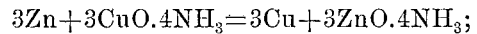
$$3Zn + 3CuO.4NH_3 = 3Cu + 3ZnO.4NH_3;$$

but an almost equally rapid separation may be effected and a minimum amount of metallic zinc used if a comparatively small surface is exposed to the solution, the zinc being in contact with some electrical conductor, inert as regards the solution, but exposing a good deal of surface thereto—such, for instance, as metallic iron. The clear liquor now contains the zinc which was extracted from the ore or cinder and the zinc used in precipitating the copper, if the preferred mode of separation is employed. The zinc is probably partially in the form of ammonium zincate, ($3ZnO.4NH_3$+aqua,) due to the action of the $NH_4OH$ upon the ZnO and upon the metallic zinc, if used, and the balance is probably present as ammonium zinc sulfate, ($ZnSO_4.4NH_3$+aqua,) due to the action of the aqua-ammonia upon the $ZnSO_4$ and also from the action of the ammonium sulfate upon the ZnO.

It may be stated here that the copper before separation is probably in analogous forms—that is, $$3CuO.4NH_3 + aqua$$

and $$CuSO_4.2 \text{ to } 5NH_3 + aqua.$$

In order to separate the ZnO from the aqua-ammonia, it is only necessary to distil off the latter; but this will not at any reasonable temperature break up the ammonium zinc sulfate. If, however, the residue is heated sufficiently the ammonium sulfate is broken up by the ZnO present, $$(NH_4)_2SO_4 + ZnO = ZnSO_4 + 2NH_3 + H_2O,$$

and the $NH_3$ is driven off from the $ZnSO_4.4NH_3$, leaving $ZnSO_4$ and the excess of ZnO in the residue. This may be worked up into zinc sulfate by adding a little more $H_2SO_4$, or it may be all converted into oxid by digesting with an alkali and dissolving out the resulting alkaline sulfate. I prefer, however, if zinc oxid is the form of the zinc desired, to add to the zinc solution before the $NH_3$ is distilled off some base which is powerful enough to break up $ZnSO_4$ and $(NH_4)_2SO_4$, and for this purpose I prefer to use soda, the cheapest form being $Na_2CO_3$. By this latter treatment much less heat is required to drive off the $NH_3$, and we can also be sure that the ZnO contains no trace of $ZnSO_4$. Enough of the base is added to combine with all of the $SO_3$ present to form $MSO_4$, M denoting the base, and the solution is evaporated to drive off the ammonia and the $CO_2$ if a carbonate was used, the former being collected in water to form aqua-ammonia.

The more closely the evaporation is carried on toward dryness the more completely will the ammonia be driven off, and the residue consists of only ZnO or $ZnO_2H_2$ and $MSO_4$. This residue is treated with water to dissolve out the $MSO_4$, and if soda is the base the resulting $Na_2SO_4$ is crystallized and may be sold as Glauber salt. The final residue is ZnO or ZnO with $ZnO_2H_2$, and if the latter is present it may be converted by calcination into the oxid, which is very useful as a paint base—i. e., zinc-white.

Enough of the reformed aqua-ammonia is taken for making a fresh supply of solvent, and the balance may be sold as aqua-ammonia. This solvent is used on fresh cinder or ore, the ammonium sulfate being added as before. In case any soluble ferrous salts are present in the ore or cinder a certain amount of ferrous hydroxid will be dissolved, and by oxidation this can be separated as ferric hydroxid. Any suitable oxidizing agent may be used, such as chlorin, sodium peroxid, potassium permanganate, air, &c. The $(NH_4)_2SO_4$ may, if desired, be introduced into the digester with the ore or cinder and the aqua-ammonia added instead of first dissolving the ammonium sulfate in the aqua-ammonia. It will be observed that the zinc and copper are thus readily recovered in a cheap and ready manner and that the reagents are recovered either in their original form or in the form of commercial products.

Having described my invention, what I claim as new, and desire to secure by Letters Patent, is—

1. The process of extracting zinc and copper from ore or residue, which consists in dissolving zinc and copper and their soluble salts from the ore or residue by treatment with a solvent including aqua-ammonia and an ammoniacal salt in solution; separating the copper from the solution; and driving off the ammonia from the remaining liquor in the presence of a base stronger than ammonia or zinc oxid, the said base combining with practically all of the acid radicals present to form one or more salts of said base.

2. The process of extracting zinc and copper from ore or residue, which consists in dissolving zinc and copper and their soluble salts from the ore or residue by treatment with a solvent including aqua-ammonia and an ammoniacal salt in solution; separating the copper from the solution; driving off the ammonia from the remaining liquor in the presence of a base stronger than ammonia or zinc oxid, the said base combining with practically all of the acid radicals present to form one or more salts of said base; and finally eliminating such salt or salts in the residue.

3. The process of extracting zinc and copper from ore or residue containing soluble sulfates, which consists in dissolving the zinc and copper in aqua-ammonia; separating the copper from the solution; adding a base stronger than ammonia or zinc oxid to the remaining liquor, to form a sulfate of said base with any sulfuric oxid present; driving off the ammonia by evaporating, and finally dissolving the so-formed sulfate of the base from the residual oxid, or oxid and hydroxid of zinc.

4. The process of extracting zinc and copper from ore or residue, which consists in treating the same with aqua-ammonia and ammonium sulfate; separating the copper from the resulting solution; adding a base stronger than ammonia or zinc oxid to the remaining liquor to form a sulfate of said base with any sulfuric oxid present, and driving off ammonia; and finally dissolving out the so-formed sulfate of the base from the residue.

5. The process of extracting zinc and copper from ore or residue, which consists in transforming oxids of said metals into ammonium zincate and cuprate, and ammonium, zinc, and copper sulfates, in solution, by treatment with aqua-ammonia and ammonium sulfate; separating the copper from the solution; adding a base stronger than ammonia or zinc oxid to the remaining liquor to form with any sulfuric oxid present a sulfate of said base; evaporating to drive off the ammonia; and dissolving out the so-formed sulfate of the base from the residue with water, oxid, or oxid and hydroxid of zinc remaining.

6. The process of extracting zinc and copper from ore or residue containing a soluble ferrous salt, which consists in treating with aqua-ammonia and ammonium sulfate, to dissolve the zinc and copper; separating the copper from the solution; oxidizing the described ferrous hydroxid to separate out ferric hydroxid; adding a base stronger than ammonia or zinc oxid to the remaining liquor to form with any sulfuric oxid present a sulfate of said base, and evaporating to drive off ammonia; and finally dissolving out the sulfate of said base from the residue.

7. The process of extracting zinc and copper from ore or residue, which consists in treating the same with aqua-ammonia and ammonium sulfate; separating the copper from the resulting solution; adding sufficient soda to combine with all of the sulfuric oxid present and form sulfate of soda, and evaporating the solution to drive off ammonia, the latter being collected in water; and treating the residue with water to dissolve out the sulfate of soda, the zinc oxid remaining.

In testimony whereof I have signed my name to this specification in the presence of two subscribing witnesses.

HENRY HOWARD.

Witnesses:
JOHN COWPER EDWARDS,
ALEX. C. PROUDFIT.